United States Patent [19]

McGeachy et al.

[11] Patent Number: 5,595,413
[45] Date of Patent: Jan. 21, 1997

[54] FLUID ACTUATED GRIPPER

[75] Inventors: Donald E. McGeachy, Commerce Township, Mich.; Jeffrey R. Schneid, North Olmstead, Ohio

[73] Assignee: Numation, Inc., Westlake, Ohio

[21] Appl. No.: 355,085

[22] Filed: Dec. 12, 1994

[51] Int. Cl.⁶ ..................................... B25J 15/08
[52] U.S. Cl. ...................... 294/88; 294/119.1; 901/37
[58] Field of Search ................... 294/88, 93, 119.1; 269/25, 27, 32, 34; 901/36, 37, 39

[56] References Cited

U.S. PATENT DOCUMENTS

| | | | |
|---|---|---|---|
| 4,252,358 | 2/1981 | Klebs | 294/119.1 X |
| 4,588,068 | 5/1986 | Nebelung | 294/119.1 X |
| 4,611,377 | 9/1986 | McCormick | 294/119.1 X |
| 4,913,481 | 4/1990 | Chin et al. | 294/119.1 X |
| 5,163,729 | 11/1992 | Borcea et al. | 294/119.1 |

FOREIGN PATENT DOCUMENTS

| | | | |
|---|---|---|---|
| 22331 | 1/1981 | European Pat. Off. | 294/119.1 |
| 0208863 | 1/1987 | European Pat. Off. | |
| 0344954 | 12/1989 | European Pat. Off. | |
| 3806148 | 9/1988 | Germany. | |
| 19513739 | 10/1995 | Germany. | |
| 812569 | 3/1981 | U.S.S.R. | 901/37 |
| 2041262 | 9/1980 | United Kingdom. | |

*Primary Examiner*—Johnny D. Cherry
*Attorney, Agent, or Firm*—Barnes, Kisselle, Raisch, Choate, Whittemore & Hulbert

[57] ABSTRACT

A fluid actuated gripper mechanism with opposed gripper slides received on ways of a housing and actuated by opposed pistons received in a common bore. Each piston is transfixed by a coupling pin secured to one slide. Movement of the pistons and slides is synchronized by a lever pivotally mounted in the housing and having equally radially spaced apart and parallel elongate cam slots in which the coupling pins are received.

8 Claims, 1 Drawing Sheet

5,595,413

FLUID ACTUATED GRIPPER

FIELD OF INVENTION

This invention relates to a fluid actuated gripper mechanism for engaging, handling and releasing work parts by a pair of opposed movable jaws.

BACKGROUND OF THE INVENTION

Work gripping mechanisms for handling work parts are especially useful in automated equipment, such as at the end of robotic arms which move parts as desired in a production process. Fluid actuation is desirable since it allows operation remote from the source of fluid pressure and control valves.

One example of a gripper assembly is found in U.S. Patent to Borcea at al, U.S. Pat. No. 5,163,729, issued Nov. 17, 1992, which discloses a mechanism using opposed fluid actuated jaws with a rack and pinion arrangement synchronizing movement of the jaws.

SUMMARY OF THE INVENTION

A gripper with a pair of opposed slides is received in a common way of a housing and actuated by a pair of opposed pistons received in a common cylinder bore in the housing. Movement of the pistons and slides is synchronized by a synchronizing lever centrally pivotally mounted and enclosed within the housing and having equally radially spaced apart cams preferably in the form of elongate and parallel slots adjacent opposed ends of the lever. Preferably, each slide, piston and one cam are operably connected by a pin slidably received in the cam slot, extending transversely through the piston and secured to the slide. Preferably, the pistons are received between the slides and the synchronizing lever and the pistons, pins and lever are completely enclosed in the housing to prevent contamination of the mechanism. If desired, the piston can be spring biased and fluid actuated in one or both directions. For applications where the pistons and slides need not be synchronized, the lever and cams can be omitted. The pistons will also stabilize and provide a guide for reciprocable movement of the pins. Preferably, the opposed ends of the cylinder bore are closed by cover plates releasably secured to the housing and preferably contain ports for directing fluid to actuate the pistons.

Objects, features and advantages of this invention are to provide a gripper in which movement of the slides and pistons is easily and accurately synchronized, the operating mechanism is enclosed to prevent exposure, contamination and damage, the slides, pistons and sychronizers are simply and easily operably coupled together, and the gripper can be produced in a wide range of sizes and is extremely compact, lightweight, simple, rugged, durable, reliable, quick and easy to use, of relatively simple and economical design, manufacture and assembly and in service has a long useful life and requires little maintenance.

BRIEF DESCRIPTION OF THE DRAWINGS

These and other objects, features and advantages of the invention will be apparent from the following detailed description of the preferred embodiment and best mode, appended claims and accompanying drawings in which:

Figure 1:
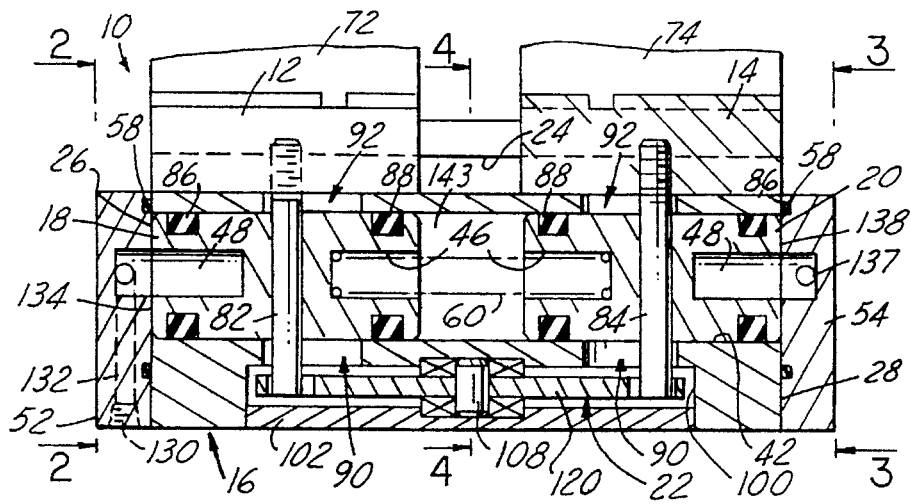
FIG. 1 is a longitudinal sectional assembly view of a gripper mechanism embodying the invention.
Figures 2, 3, 4:
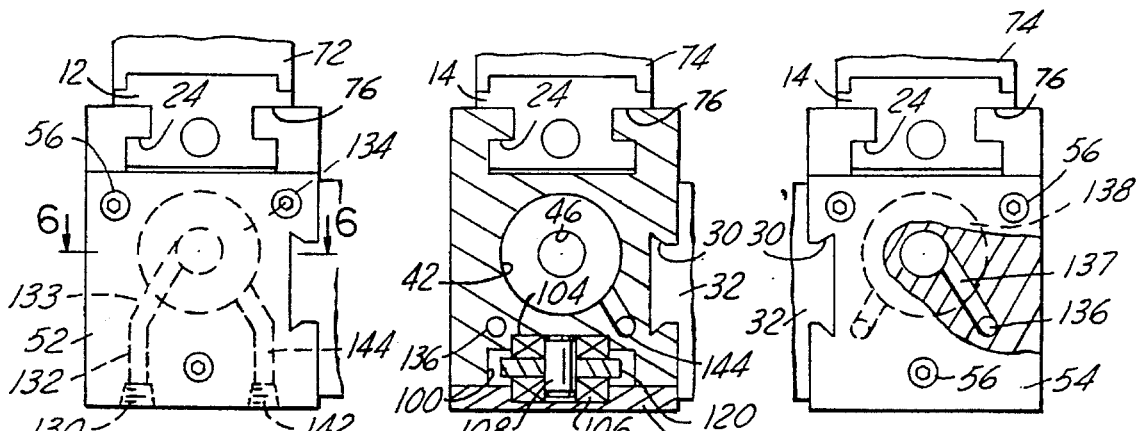
Figure 5:
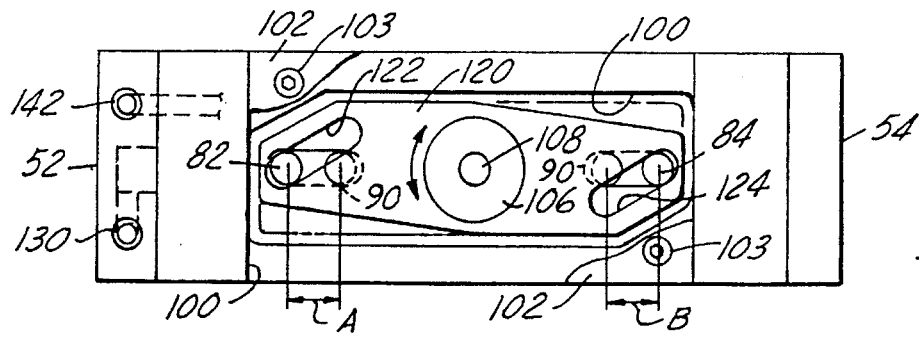
Figure 6:
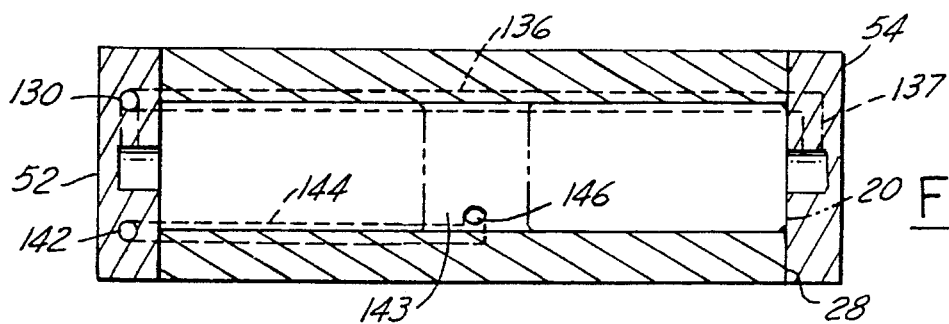

FIGS, 2, 3 and 4 are views taken respectively at lines 2—2, 3—3 and 4—4 of FIG. 1;

FIG. 5 is a bottom view of a synchronizer lever, taken on FIG. 1 with the bottom plate removed; and FIG. 6 is a longitudinal sectional view taken on line 6—6 of FIG. 2.

DETAILED DESCRIPTION

Referring in more detail to the drawings, FIG. 1 illustrates a gripper 10 embodying this invention with a pair of opposed slides 12 & 14 carried by a housing 16 and actuated by a pair of opposed pistons 18 & 20. Reciprocable movement of the slides and pistons is synchronized by a synchronizer mechanism 22. Ways and guides for reciprocation of the slides are provided by a slot 24 with a T-shape cross section which opens through the top of the housing and extends longitudinally completely through the housing and opens into its opposed ends 26 & 28. Preferably, for mounting the gripper, a dovetail 30 extends longitudinally across a side of the housing for complementary engagement with a mounting block 32 which may be secured to the end of a robot, on a transfer device, a machine tool, or the like.

Preferably, the pistons 18 & 20 are slidably received in a common bore 42 through the housing. Preferably, to decrease the weight of the pistons, they have blind bores 46 & 48 in their opposed ends. The ends of the bore 42 are closed by end plates 52 and 54 secured to the housing by cap screws 56. Suitable seals 58, such as O-rings, are disposed between them. If it is desired to yieldably bias the slides and pistons away from each other, a suitable compression spring 60 is disposed in the opposed blind bores 46 of the pistons. If it is desired to yieldably bias the slides and pistons toward each other, the spring 60 is omitted and a pair of suitable compression springs are disposed in the blind bores 48 of the pistons with one spring end bearing on the adjacent end plate 52 or 54.

Workpiece gripper blocks or fingers 72 & 74 are mounted on and secured to the slides 12 and 14. Each slide has a pair of longitudinally extending slots 76 providing a complementary generally H-shaped cross section with complementary interfitting surfaces engaging the ways of the housing formed by the T-shaped slot 24. The slides are retained on the ways of the housing and operably connected with the pistons by coupling pins 82 and 84 transfixed or slidably received in bores through the pistons and with the upper end of each pin threaded into a blind bore in the slide.

Adjacent both ends, each piston is provided with a fluid tight seal between the piston and bore 42 by annular seals 86 & 88. To provide clearance for movement of the coupling pins 82 & 84 with the pistons, elongate slots 90 and 92 are provided in the bore 42 and housing 16 through which the pins pass. To prevent escape through the slots of fluid pressure acting on the pistons, the slots 90 and 92 adjacent each piston lie longitudinally between the seals 86 and 88 of the piston regardless of whether the piston is fully retracted (as shown in FIG. 1), or fully extended. To prevent contaminants from entering the sleeve through the upper slots 92, they are always covered by their associated slide 12 or 14 regardless of the extended or retracted position of the slide and preferably, to provide a seal, the lower face of each slide bears on the underlying face of the T-shape slot 24 in the housing.

The synchronizing mechanism 22 is received in a cavity 100 in the bottom of the housing which is closed and sealed by a cover plate 102 releasably secured in a recess in the housing by cap screws 103. The synchronizer has a lever 120 pivoted on a centrally located pin 108 journalled for rotation by a pair of opposed bearings 104 & 106 (FIGS. 1 and 4) received in opposed circular recesses in the housing 16 and the cover plate 102. The lever 120 has adjacent its end two cam slots 122 & 124 through which the lower ends of the coupling pins 82 & 84 extend and engage the side walls of the slots. The elongate cam slots are parallel to each other, diametrically opposed and equally radially spaced from the axis of pin 108 on which they pivot. Preferably, the pins have a "close fit" sliding engagement with the cam slots.

As shown in FIG. 5, movement of the piston 18 and its coupling pin 82 from its solid line position to its phantom broken line position through the axial or longitudinal distance designated at A will in cooperation with the cam slot 122, rotate the lever counterclockwise and through the cooperation of cam slot 124 with the coupling pin 84 will move the pin 84 and its associated piston 20 through an equal longitudinal or axial distance B from the solid line to the phantom line position of the pin 84. This movement of either piston in either axial direction will cause through the cooperation of the coupling pins, cam slots and lever, movement of the other piston an equal distance. Thus, the sychronizing mechanism 22 will insure that the pistons and their associated slides will always move in precise and accurate synchronism at all times.

The pistons also serve as guides which stablize and prevent the pins from tilting or cocking relative to the longitudinal axis of the bore 42 thereby insuring smooth and accurate movement without binding of the synchronizing mechanism and the slides. Disposing the slides and the synchronizing lever and cams on opposite sides of the pistons also tends to better balance the forces acting and reacting on the slides and synchronizing mechanism when the gripping blocks and fingers on the slides are forced into and maintained in engagement with a workpiece by pressurized fluid acting on the pistons.

The pistons are actuated by a hydraulic or pneumatic fluid under pressure. The pistons are moved inwardly by fluid under pressure acting on their outer ends 134 and 138 which is admitted through the port 130 in end plate 52 (FIGS. 1 and 2). Fluid from port 130 is admitted to the outer face 134 of piston 18 through connecting passages 132 and 133. Simultaneously, fluid under pressure is admitted to the outer face 138 of piston 20 through a passage 136 extending longitudinally through the housing 16 and an interconnecting transverse passage 137 in end plate 54. If desired, when the fluid pressure is relieved through port 130, the pistons and slides can be retracted or moved outwardly by the bias of the compression spring 60. However, in many applications, it is preferable to positively return and retract the pistons and hence the slides by both relieving the fluid pressure at port 130 and simultaneously applying fluid pressure to the inner ends of the pistons to force them outwardly.

Fluid is supplied to the inner ends of the pistons through the port 142 in end plate 52 which communicates with the chamber 143 between the inner ends of the pistons through an interconnecting passage 144 extending longitudinally into the housing from its end 26 and a transverse passage 146 which opens into the chamber 143 between the pistons.

In use, the gripper 10 is typically mounted on a workpiece transfer device, such as the end of the arm of a robot. The ports 130 and 142 are connected to a source of fluid pressure such as compressed air through a suitable control valve, such as a solenoid actuated four way control valve. Typically, the grippers 72 and 74 are arranged on the slides so they will be disengaged from the workpiece when the slides and pistons are in the retracted position as shown in FIG. 1. To engage a workpiece, the gripper is properly positioned by the robot and the solenoid valve is energized to supply compressed air through the port 130 to act on the outer faces 134 & 138 of the pistons to move them and the slides inward into firm engagement with the workpiece which is then transferred by the robot while held by the grippers.

After the desired operation or operations are performed, the workpiece is transferred by the robot, then released by the gripper 10. The workpiece is released by actuating the solenoid valve to relieve the compressed air through port 130 and to supply compressed air through the port 142 to act on the inner ends of the pistons to move them outwardly to their retracted positions along with the slides so that the grippers disengage and release the workpiece. The movement of the pistons and the slides is synchronized by the cooperation of the coupling pins 82 and 84 with the cam slots 122 and 124 and the lever 120.

It will be appreciated that some types of workpieces will be engaged by moving the slides outward and disengaged and released by moving the slides inward. This can be accomplished by reversing the application and relief of fluid pressure to the ports 130 and 142 from the sequence just discussed and hence will not be stated in further detail since it will be apparent to skilled persons.

What is claimed is:

1. A fluid actuated gripper mechanism of the type having opposed gripper devices mounted for sliding relation to and from a gripping position which comprises:

(a) a housing, (b) opposed gripper slides mounted on said housing for lineal reciprocation, (c) a piston bore extending axially of said housing adjacent said slides, (d) opposed pistons in said bore, (e) coupling pins coupling said pistons to said slides, each said coupling pin transfixed one piston and has a first end extending into a gripper slide to cause simultaneous motion of said one piston and slide, and (f) a synchronizing lever located in said body, centrally mounted to pivot on an axis perpendicular to the axis of said piston bore, said lever having parallel cam slots, one at each end, angled to the path of lineal reciprocation of said slides, and a second end of each said transfer pin is located in a respective cam slot to provide simultaneous synchronous motion of said pistons and slides when actuated, wherein fluid directed to said pistons actuates said slides simultaneously.

2. A fluid actuated gripper mechanism as defined in claim 1 in which an elongate recess is formed in said housing adjacent said piston bore, a central pivot in said recess mounting said lever in said recess and a closure plate closing said recess to avoid contamination of said lever and pins.

3. A fluid actuated gripper mechanism as defined in claim 1 which also comprises end plates on said housing to close said piston bore, and passages in at least one of said end plates and said housing to direct operating fluid to the outer ends of said pistons to produce a gripping motion and to the inner ends to produce a release motion.

4. A fluid actuated gripper mechanism as defined in claim 1 which also comprises a clearance slot associated with each coupling pin through which it extends adjacent its associated slide, each said clearance slot underlying and being closed by its associated slide regardless of the position of its associated piston to prevent contaminants from entering the piston bore through said clearance slot.

5. A fluid actuated gripper mechanism comprising: a housing having sides and a pair of opposed ends, a slot in said housing opening through a side and extending longitudinally through the housing and opening into its opposed ends to provide ways for slides, a pair of generally opposed gripper slides received in said slot for linear reciprocal movement, a bore extending axially through the housing and opening into the opposed ends of the housing, a pair of opposed pistons received in said bore, a synchronizing lever carried by the housing and centrally mounted to pivot on an axis perpendicular to the axis of the bore, said lever having a pair of parallel cams one adjacent each end of the lever, said cams being inclined to the path of reciprocal motion of the slides, and a separate pin extending transversely through each piston and having a first end coupled with an associated gripper slide to cause simultaneous motion of the one piston and associated gripper slide, and a second end engaging with an associated one of the cams of the lever to provide simultaneous synchronous motion of the pistons and slides when actuated, whereby fluid directed to the pistons synchronously moves the slides simultaneously.

6. A fluid actuated gripper mechanism as defined in claim 5 in which a recess is formed in said housing adjacent said bore, a central pivot in said recess mounts said lever in said recess and a closure plate closes said recess to avoid contamination of said lever and pins.

7. A fluid actuated gripper mechanism as defined in claim 5 which also comprises end plates on said housing to close said bore, and passages in at least one of said end plates and said housing to direct operating fluid to the outer ends of said pistons to produce a gripping motion and to the inner ends to produce a release motion.

8. A fluid actuated gripper mechanism as defined in claim 5 which also comprises a clearance slot in said housing and associated with each coupling pin through which it extends adjacent its associated slide, each said clearance slot underlying and being closed by its associated slide regardless of the position of its associated piston to prevent contaminants from entering the piston bore through said clearance slot.

* * * * *